United States Patent

[11] 3,529,576

| [72] | Inventor | Gordon M. Candee |
| | | High St., Canaan, Connecticut 06018 |
| [21] | Appl. No. | 718,154 |
| [22] | Filed | April 2, 1968 |
| [45] | Patented | Sept. 22, 1970 |

[54] POULTRY BAND AND CONTAINER
3 Claims, 5 Drawing Figs.

| [52] | U.S. Cl. | 119/156 |
| [51] | Int. Cl. | A01k 29/00 |
| [50] | Field of Search | 119/156, 97 |

[56] References Cited
UNITED STATES PATENTS

| 1,203,590 | 11/1916 | Day | 119/156 |
| 1,321,819 | 11/1919 | Gottschalk | 119/97 |
| 2,138,040 | 11/1938 | Perry | 119/156 |

*Primary Examiner*—Hugh R. Chamblee
*Attorney*—E. Seward Stevens

ABSTRACT: A poultry band and a refillable slit or perforated container, the band being adapted to be clamped to the leg of fowl and the container being adapted to hold a disinfestant in a position most effective for destroying lice or other vermin with which fowl are sometimes infested.

Patented Sept. 22, 1970

3,529,576

INVENTOR.
GORDON M. CANDEE
BY
E. Seward Stevens
HIS ATTORNEY

POULTRY BAND AND CONTAINER

Heretofore, bird bands and poultry bands have been provided with medication but have had the disadvantage in that the ring or band when slipped around the leg of the bird could not maintain itself in the most effective location, and, in some cases, the container was not refillable with medication. Other bands have been provided which are awkward to secure or which suffered from other disadvantages overcome by my invention.

The object of my invention is to provide a poultry band and its refillable container in which the band is resilient and adapted to open to encompass and clamp the leg of a fowl, and the container has openings to permit the escape therethrough of a disinfestant, said container portion being provided with a removable cover.

A practical embodiment of the invention is illustrated in the accompanying drawings in which.

Referring to the accompanying drawings, an elongated band 1 is provided with longitudinal raised portions 2 and 3 for purposes described below. The said band 1 is slit at 4 as shown in FIG. 2.

Formed integral with the band 1 is a container portion denoted by 5, which container is slotted at 6, 7 and 8, for example, and provided with a band 9 extending substantially around the top portion of the container and, particularly, encompassing the slotted portions thereof.

Figure 1:
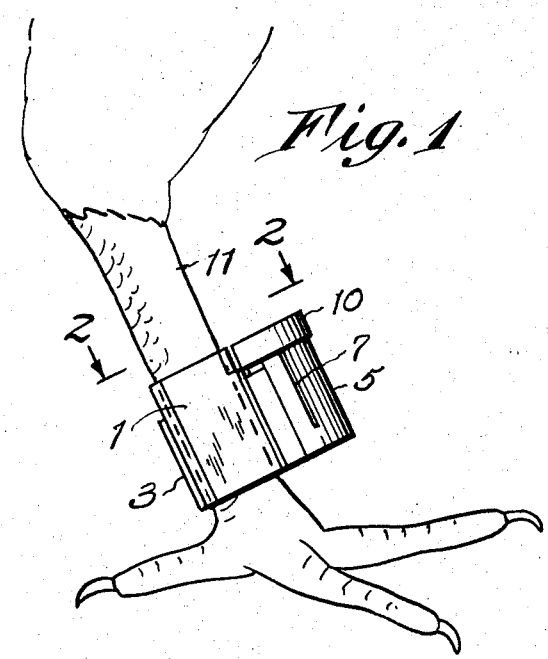
FIG. 1 represents the device attached in the desired manner and location for most effective use.
Figure 2:
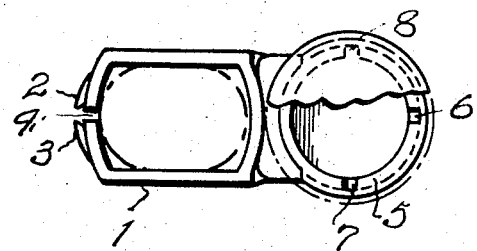
FIG. 2 is a plan view, partly broken away, of the apparatus shown in FIG. 1.
Figure 3:
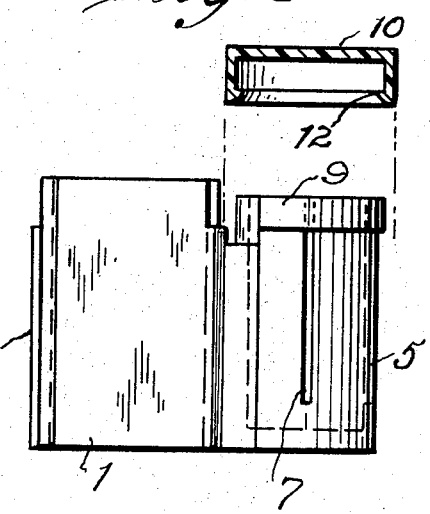
FIG. 3 is a side view of the embodiment shown in FIGS. 1 and 2, the cover having been removed from the container section and being shown in cross section.
Figure 4:
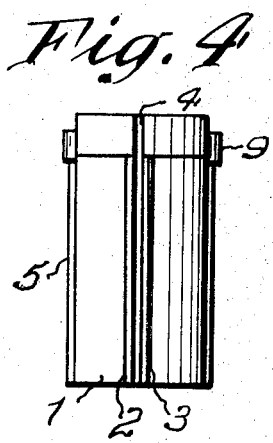
FIG 4 is an end view looking from the left of FIGS. 1, 2 and 3.
Figure 5:
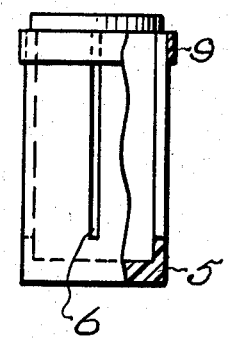
FIG. 5 is an end view of the container section partly broken away, looking from the right of FIGS. 1, 2 and 3.

A cover 10 is provided to fit over the band 9 as illustrated in FIGS. 1, 2 and 3, which cover is removable as is illustrated in FIG. 3. The device is normally provided with suitable disinfestant by inserting same in the container 5 and placing the cover 10 thereover to close same.

The band 1 is then distended by applying a reverse pliers or other suitable tool (not shown) to the projections 2 and 3 on band 1 in order to sufficiently widen the slot 4 so that the band may be applied to the leg 11 of a bird as shown in FIG. 1.

It will be noted that the band 1 is elongated to fit the leg 11 of a bird in such a way that it will be maintained in position on the front of the leg. In this position, when the bird sits down or nests, the container 5 is tucked up in the feathers for more effect against mites or other insects. Because of the nature of the contact of the container with the fowl, a small amount of insecticide may be caused to fume to kill the vermin. In this connection, it is necessary to relate the size of the slots or perforations in the container 5 to the size of the container in order to furnish a predetermined volume of the escaping insecticide or other material. The efficiency of the capsule depends upon the design of the band 9 and the container body 5. The cap 10 is designed so that it may be secured by a flange 12 on the inside of the cap 10 which engages or snaps over a flange 9 located around a part of the outside of the container 5.

The flange 9 is discontinued between the capsule or container and the leg engaging band so that the cap 10, when snapped on the container 5, is closed to touching the band 1. This prevents the apparatus from "hanging up" in wire or other projections which might restrict the movement of the bird or dislodge the band.

Since it is evident that changes may be made in the form, construction and arrangements of the several parts without departing from the spirit and scope of my invention, I do not intend to be limited to the particular embodiment herein shown and described except as set forth in the appended claims.

I claim:

1. A poultry band comprising, in combination, a vertically elongated distensible leg band, a substantially vertically slotted portion of said band, a perforate container formed integral with said band spaced from said slotted portion, a removable cap for said container, and means on the band for engagement by other means for distending the band to encompass the leg of a fowl.

2. A poultry band comprising, in combination, an elongated distensible leg band, said band being vertically slotted at one end, a perforate container formed integral with said band and spaced from said slotted portion, a removable cap for said container, means on the band for engagement by other means for distending the band to encompass the leg of a fowl, said last named means comprising vertically raised portions adjacent the band slotted portion adapted for engagement by manually operable means for distending the band.

3. A poultry band comprising, in combination, an elongated distensible leg band, a slotted portion of said band, a perforate container formed integral with said band, a removable cap for said container, and a raised band extending substantially around the top of the perforated portions of the container, said removable cap being adapted to fit over said raised band and lie adjacent the leg band, and means on the band for engagement by other means for distending the band to encompass the leg of a fowl.